(12) United States Patent
Ishii et al.

(10) Patent No.: US 9,393,872 B2
(45) Date of Patent: Jul. 19, 2016

(54) POWER SUPPLY SYSTEM FOR VEHICLE AND VEHICLE INCLUDING THE SAME

(75) Inventors: Daisuke Ishii, Toyota (JP); Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 271 days.

(21) Appl. No.: 13/699,694

(22) PCT Filed: Nov. 5, 2010

(86) PCT No.: PCT/JP2010/069691
§ 371 (c)(1),
(2), (4) Date: Nov. 23, 2012

(87) PCT Pub. No.: WO2012/060009
PCT Pub. Date: May 10, 2012

(65) Prior Publication Data
US 2013/0249282 A1    Sep. 26, 2013

(51) Int. Cl.
*B60R 16/03* (2006.01)
*B60L 3/00* (2006.01)
*H02J 7/00* (2006.01)
(Continued)

(52) U.S. Cl.
CPC .............. *B60L 3/0092* (2013.01); *B60L 1/003* (2013.01); *B60L 3/0069* (2013.01); *B60L 3/04* (2013.01); *B60L 11/005* (2013.01); *B60L 11/123* (2013.01); *B60L 11/14* (2013.01); *B60L 11/185* (2013.01); *B60L 11/1818* (2013.01); *B60L 11/1846* (2013.01); *H02J 7/0055* (2013.01); *B60L 2210/10* (2013.01); *B60L 2210/30* (2013.01); *B60L 2210/40* (2013.01); *B60L 2220/14* (2013.01); *B60L 2250/10* (2013.01); *Y02T 10/6217* (2013.01); *Y02T 10/7005* (2013.01); *Y02T 10/7022* (2013.01); *Y02T 10/7072* (2013.01); *Y02T 10/7077* (2013.01); *Y02T 10/7216* (2013.01); *Y02T 10/7241* (2013.01); *Y02T 90/121* (2013.01); *Y02T 90/127* (2013.01);
(Continued)

(58) Field of Classification Search
CPC .................................... G06F 1/00; G06F 1/66
USPC ........................................................ 307/10.1
See application file for complete search history.

(56) References Cited

U.S. PATENT DOCUMENTS

| | | | | |
|---|---|---|---|---|
| 5,650,710 A | * | 7/1997 | Hotta ..................... | B60L 3/0046 320/128 |
| 5,931,245 A | * | 8/1999 | Uetake ..................... | B60L 3/00 180/65.8 |

(Continued)

FOREIGN PATENT DOCUMENTS

| JP | A-2003-244832 | 8/2003 |
|---|---|---|
| JP | 2009-136110 A | 6/2009 |

(Continued)

*Primary Examiner* — Thienvu Tran
*Assistant Examiner* — David M Stables
(74) *Attorney, Agent, or Firm* — Oliff PLC

(57) ABSTRACT

A power supply system for a vehicle includes a power storage device, a plurality of charging paths for charging the power storage device with electric power from the outside, a plurality of relays provided on the plurality of charging paths respectively, each for switching between supply and cut-off of electric power, and a charge control unit for making selection as to through which charging path among the plurality of charging paths charging of the power storage device is permitted, based on a state of welding of the plurality of relays.

14 Claims, 11 Drawing Sheets

(51) Int. Cl.
  *B60L 3/04* (2006.01)
  *B60L 11/00* (2006.01)
  *B60L 11/12* (2006.01)
  *B60L 11/14* (2006.01)
  *B60L 11/18* (2006.01)
  *B60L 1/00* (2006.01)

(52) U.S. Cl.
  CPC ............... *Y02T 90/128* (2013.01); *Y02T 90/14* (2013.01); *Y02T 90/169* (2013.01); *Y04S 30/14* (2013.01)

(56) References Cited

U.S. PATENT DOCUMENTS

2006/0071618 A1* 4/2006 Yudahira ............. B60L 3/0023 318/12
2009/0079389 A1* 3/2009 Ohtomo ................. B60K 6/28 320/109

FOREIGN PATENT DOCUMENTS

| JP | A-2011-015548 | 1/2011 |
| WO | WO 97/10967 | 3/1997 |

* cited by examiner

DURING CHARGING THROUGH CORD REEL

FIG.9

| INLET RELAY (RELAY 51-2) | CORD REEL RELAY (RELAY 51-1) | CHARGING | |
| --- | --- | --- | --- |
| | | INLET SIDE | CORD REEL SIDE |
| WELDED | NOT FAULTY | PERMITTED | CONDITIONALLY PERMITTED |
| NOT FAULTY | WELDED | PROHIBITED | PERMITTED |
| WELDED | WELDED | PROHIBITED | CONDITIONALLY PERMITTED |
| NOT FAULTY | NOT FAULTY | PERMITTED | PERMITTED |

FIG.12

| NORMAL-RATE CHARGING RELAY (RELAY 51-2) | RAPID CHARGING RELAY (RELAY 51-1A) | CHARGING PERMISSION | |
|---|---|---|---|
| | | NORMAL-RATE CHARGING SIDE | RAPID CHARGING SIDE |
| WELDED | NOT FAULTY | PERMITTED | CONDITIONALLY PERMITTED |
| NOT FAULTY | WELDED | CONDITIONALLY PERMITTED | PERMITTED |
| WELDED | WELDED | CONDITIONALLY PERMITTED | CONDITIONALLY PERMITTED |
| NOT FAULTY | NOT FAULTY | PERMITTED | PERMITTED |

POWER SUPPLY SYSTEM FOR VEHICLE AND VEHICLE INCLUDING THE SAME

TECHNICAL FIELD

The present invention relates to a power supply system for a vehicle and a vehicle including the same, and particularly to a vehicle incorporating a power storage device configured to be chargeable with an external power supply.

BACKGROUND ART

A vehicle including a motor for driving the vehicle and a power storage device for supplying electric power to the motor has been proposed so far. In addition, a configuration for charging a power storage device mounted on a vehicle with an external power supply has been proposed.

For example, WO97/10967 (Patent Document 1) discloses a safety mechanism used for an electric vehicle with various safety performances improved. This electric vehicle has a running-prohibiting unit allowing running only while a charge cord is stored, a regenerative brake unit with its braking performance and regenerative performance improved, a main stand unit for easy operation of a stand, a rear wheel driving mechanism by which an unsprung weight can be decreased, a structure by which heat from circuits can be used effectively and a battery can be changed easily, and the like.

PRIOR ART DOCUMENTS

Patent Documents

Patent Document 1: WO97/10967
Patent Document 2: Japanese Patent Laying-Open No. 2003-244832

SUMMARY OF THE INVENTION

Problems to be Solved by the Invention

The prior documents above describe an electric car in which a cord reel is installed and which can run only when a charge cord is stored. In such a vehicle including the cord reel, attention should be paid to avoid application of a voltage from a vehicle side to a plug portion provided at a tip end of the cord reel so as not to cause short-circuiting or leakage. In order to prevent such a situation, charging may be prohibited when various failures occur. Not permitting any charging of a mounted power storage device, however, is inconvenient, because it is impossible even to bring the vehicle to a service garage for repairing the failure.

An object of this invention is to provide a power supply system for a vehicle and a vehicle including the same, achieving both of prevention of leakage and an ensured opportunity for charging at the time of failure.

Means for Solving the Problems

In summary, this invention is directed to a power supply system for a vehicle, including a power storage device, a plurality of charging paths for charging the power storage device with electric power from the outside, a plurality of relays provided on the plurality of charging paths respectively, each for switching between supply and cut-off of electric power, and a charge control unit for making selection as to through which charging path among the plurality of charging paths charging of the power storage device is permitted, based on a state of welding of the plurality of relays.

Preferably, when welding of a relay provided on a first charging path among the plurality of charging paths is detected, the charge control unit prohibits charging of the power storage device through a charging path other than the first charging path among the plurality of charging paths.

Preferably, when welding of two or more of the plurality of relays is detected, the charge control unit prohibits charging of the power storage device from the outside of the vehicle.

Preferably, the power supply system for a vehicle further includes a lid for disconnecting any of the plurality of charging paths from an external power supply and a locking portion for fixing the lid in a disconnected state. The charge control unit makes selection as to through which charging path among the plurality of charging paths charging of the power storage device is permitted, further based on a state of locking of the lid in addition to the state of welding of the plurality of relays.

Further preferably, when the lid is locked in such a state that a corresponding charging path is disconnected from the external power supply, the charge control unit permits charging through another charging path.

Preferably, the first charging path among the plurality of charging paths is a charging path through a charge inlet, and a second charging path among the plurality of charging paths is a charging path through a cord reel connected to a side of the vehicle and a connection portion provided at a tip end of the cord reel.

Preferably, the first charging path among the plurality of charging paths is a charging path to which a first external power supply for rapid charging is connected, and a second charging path among the plurality of charging paths is a charging path to which a second external power supply for charging at a rate lower than in rapid charging is connected.

Preferably, the charge control unit notifies a user of a charging path through which charging is not permitted.

In another aspect, this invention is directed to a vehicle including the power supply system for a vehicle described in any paragraph above.

Effects of the Invention

According to the present invention, even when a failure such as relay welding occurs, charging is carried out if the situation permits. Therefore, even though a charge level of the power storage device is low, the vehicle can be charged and moved.

BRIEF DESCRIPTION OF THE DRAWINGS

FIG. 9 is a diagram for illustrating permission/prohibition of charging while a relay has welded.

FIG. 12 is a diagram for illustrating determination as to permission/prohibition of charging in the variation in FIG. 11.

MODES FOR CARRYING OUT THE INVENTION

Figure 1:
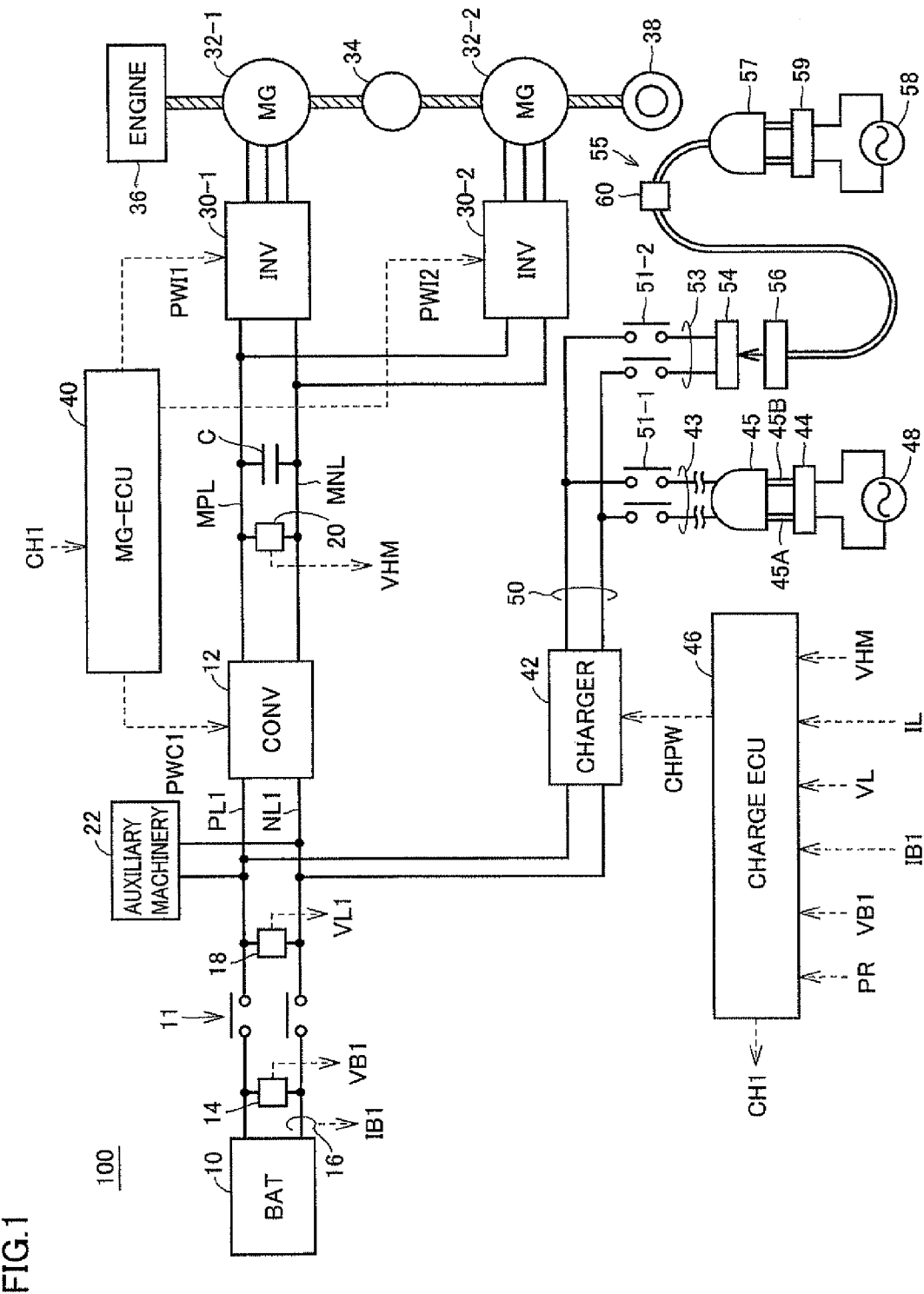
FIG. 1 is an overall block diagram of a hybrid vehicle shown as one example of an electrically powered vehicle according to a first embodiment of this invention.

An embodiment of the present invention will be described hereinafter in detail with reference to the drawings. In the drawing, the same or corresponding elements have the same reference characters allotted and description thereof will not be repeated.

First Embodiment

FIG. 1 is an overall block diagram of a hybrid vehicle shown as one example of an electrically powered vehicle according to a first embodiment of this invention. It is noted that a "hybrid vehicle" may hereinafter simply also be referred to as a "vehicle".

Referring to FIG. 1, a hybrid vehicle 100 includes a power storage device 10, a system main relay 11, a converter 12, a main positive bus MPL, a main negative bus MNL, a smoothing capacitor C, and auxiliary machinery 22. In addition, hybrid vehicle 100 further includes inverters 30-1, 30-2, motor generators 32-1, 32-2, a power split device 34, an engine 36, and drive wheels 38.

Hybrid vehicle 100 further includes voltage sensors 14, 18, 20, a current sensor 16, and an MG-ECU (Electronic Control Unit) 40. Hybrid vehicle 100 further includes a charger 42, a charge ECU 46, power cables 50, 43, a relay 51-1, and a plug 45 to be inserted in a connector 44 (such as a socket in a house) connected to an external power supply 48. Plug 45 has terminals 45A, 45B of which surface is exposed.

Hybrid vehicle 100 further includes a power cable 53, a relay 51-2, and an inlet 54 for connection to a connector 56 of a charge cable 55. Charge cable 55 includes a plug 57 for connection to a connector 59 (such as a socket in a house) connected to an external power supply 58 and a CCID (Charging Circuit Interrupt Device) 60.

Power storage device 10 is a rechargeable DC power supply, and it includes, for example, a secondary battery such as a nickel metal hydride battery or a lithium ion battery, a capacitor of a large capacity, and the like. Power storage device 10 is connected to converter 12 with system main relay 11 being interposed. System main relay 11 is provided between power storage device 10 and converter 12.

Converter 12 is connected to main positive bus MPL and main negative bus MNL. Converter 12 converts a voltage between power storage device 10 and main positive bus MPL, main negative bus MNL, based on a signal PWC1 from MG-ECU 40.

Auxiliary machinery 22 is connected to a positive electrode line PL1 and a negative electrode line NL1 disposed between system main relay 11 and converter 12. Smoothing capacitor C is connected between main positive bus MPL and main negative bus MNL and reduces an electric power fluctuation component included in main positive bus MPL and main negative bus MNL.

Inverters 30-1, 30-2 are connected in parallel to main positive bus MPL and main negative bus MNL. Inverter 30-1 drives motor generator 32-1 based on a signal PWI1 from MG-ECU 40. Inverter 30-2 drives motor generator 32-2 based on a signal PWI2 from MG-ECU 40.

Motor generators 32-1, 32-2 are each an AC rotating electric machine, and each implemented, for example, by a permanent magnet type synchronous motor including a rotor having a permanent magnet embedded. Motor generators 32-1, 32-2 are coupled to power split device 34. Power split device 34 includes a planetary gear including a sun gear, a pinion gear, a carrier, and a ring gear. The pinion gear is engaged with the sun gear and the ring gear. The carrier rotatably supports the pinion gear and it is coupled to a crankshaft of engine 36. The sun gear is coupled to a rotation shaft of motor generator 32-1. The ring gear is coupled to a rotation shaft of motor generator 32-2 and drive wheels 38. Motive power generated by engine 36 is split by this power split device 34 into a path for transmission to drive wheels 38 and a path for transmission to motor generator 32-1.

Then, motor generator 32-1 generates electric power by using motive power from engine 36 that has been split by power split device 34. For example, when SOC of power storage device 10 lowers, engine 36 starts and motor generator 32-1 generates electric power, and generated electric power is supplied to the power storage device.

Motor generator 32-2 generates drive force by using at least one of electric power supplied from power storage device 10 and electric power generated by motor generator 32-1. Drive force from motor generator 32-2 is transmitted to drive wheels 38. During braking of the vehicle, kinetic energy of the vehicle is transmitted from drive wheels 38 to motor generator 32-2 to thereby drive motor generator 32-2, so that motor generator 32-2 is actuated as a generator. Thus, motor generator 32-2 is actuated as a regenerative brake converting kinetic energy of the vehicle to electric power and recovering the electric power.

MG-ECU 40 generates a signal PWC1 for driving converter 12 and outputs generated signal PWC1 to converter 12. In addition, MG-ECU 40 generates signals PWI1, PWI2 for driving motor generators 32-1, 32-2 respectively and outputs generated signals PWI1, PWI2 to inverters 30-1, 30-2 respectively.

Charger 42 has its input ends connected to power cable 50 and has respective output ends connected to positive electrode line PL1 and negative electrode line NL1 disposed between system main relay 11 and converter 12. Charger 42 receives electric power supplied from a power supply outside the vehicle (hereinafter also referred to as an "external power supply"). Then, charger 42 receives a control signal CHPW from charge ECU 46. Charger 42 outputs a voltage suitable for charging power storage device 10. Specifically, charger 42 converts AC power from the external power supply to DC power and controls the voltage of DC power to a voltage suitable for charging power storage device 10.

As shown in FIG. 1, for example, in a case where plug 45 is connected to connector 44 and relay 51-1 is closed, charger 42 receives electric power supplied from external power supply 48 through plug 45 and power cables 43, 50. Plug 45 in this case serves as an electric power interface for receiving electric power from external power supply 48.

Alternatively, for example, in a case where inlet 54 of hybrid vehicle 100 is connected to connector 56 of charge cable 55, plug 57 of charge cable 55 is connected to connector 59 of external power supply 58, and relay 51-2 is closed, charger 42 receives electric power supplied from external power supply 58 through charge cable 55, inlet 54 and power cables 43, 50. Inlet 54 in this case serves as an electric power interface for receiving electric power from external power supply 48.

Voltage sensor 14 detects a voltage VB1 of power storage device 10 and outputs a detection value thereof to charge ECU 46. Current sensor 16 detects a current IB1 input and output to and from power storage device 10 and outputs a detection value thereof to charge ECU 46.

Voltage sensor 18 detects a voltage VL1 across positive electrode line PL1 and negative electrode line NL1 and outputs a detection value thereof to charge ECU 46. Voltage sensor 20 detects a voltage VHM across main positive bus MPL and main negative bus MNL and outputs a detection value thereof to charge ECU 46.

Charge ECU 46 receives a target value PR of charge electric power (kW/h) of power storage device 10 from a not-shown vehicle ECU during charging of power storage device 10 by external power supply 48 connected to plug 45 or during charging of power storage device 10 through charge cable 55.

Power cables 43, 53 are provided in parallel to the input ends of charger 42. When plug 45 is connected to connector 44, charge ECU 46 sets relay 51-1 to ON and sets relay 51-2 to OFF. As relay 51-1 is set to ON, an end portion of power cable 43 is electrically connected to the input end of charger 42 through power cable 50. On the other hand, as relay 51-2 is set to OFF, the end portion of power cable 53 is not connected to power cable 50 and therefore connection between the end portion of power cable 53 and the input end of charger 42 is cut off. Charger 42 thus receives electric power supplied from external power supply 48 through plug 45 and power cables 43, 50.

When inlet 54 is connected to connector 56 of charge cable 55 and plug 57 of charge cable 55 is connected to connector 59 of external power supply 58, charge ECU 46 sets relay 51-1 to OFF and sets relay 51-2 to ON. As relay 51-1 is set to OFF, the end portion of power cable 43 is not connected to power cable 50 and therefore connection between the end portion of power cable 43 and the input end of charger 42 is cut off. On the other hand, as relay 51-2 is set to ON, the end portion of power cable 53 is electrically connected to the input end of charger 42 through power cable 50. Charger 42 thus receives electric power supplied from external power supply 58 through charge cable 55, inlet 54 and power cables 43, 50.

Thus, hybrid vehicle 100 according to the first embodiment includes a plurality of charging means (power cable 43 and inlet 54) for charging the power storage device. Since the user can make use of two charging schemes, the user can select an optimal charging scheme in accordance with an environment around the vehicle. For example, when charge cable 55 is not mounted on the vehicle, the power storage device can be charged by taking power cable 43 out of the vehicle. User's convenience can thus be enhanced.

Figure 2:
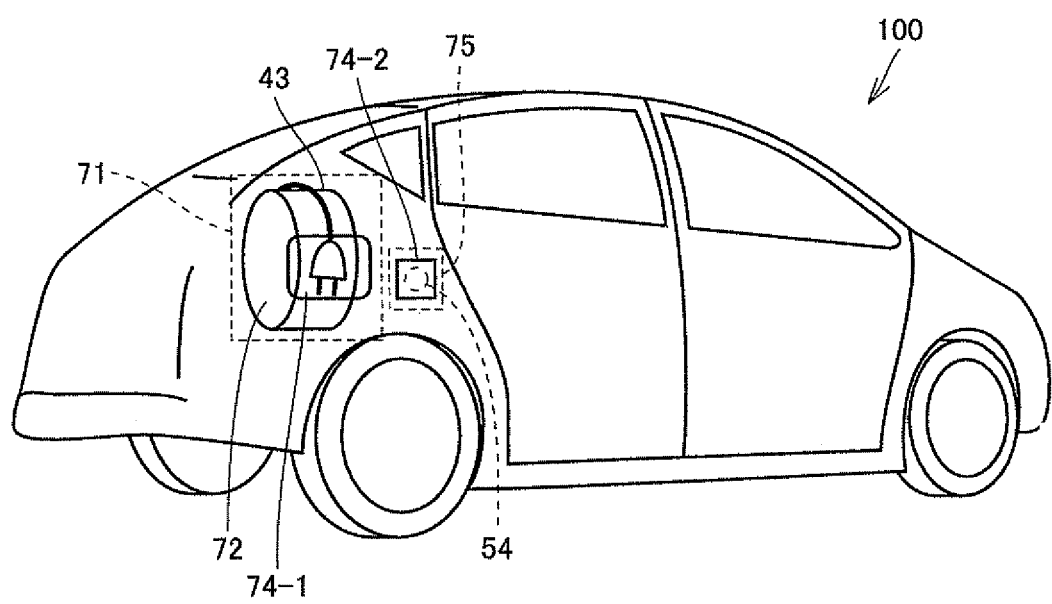
FIG. 2 is a diagram for illustrating arrangement of a power cable 43 and an inlet 54 shown in FIG. 1 in the electrically powered vehicle.
Figure 3:
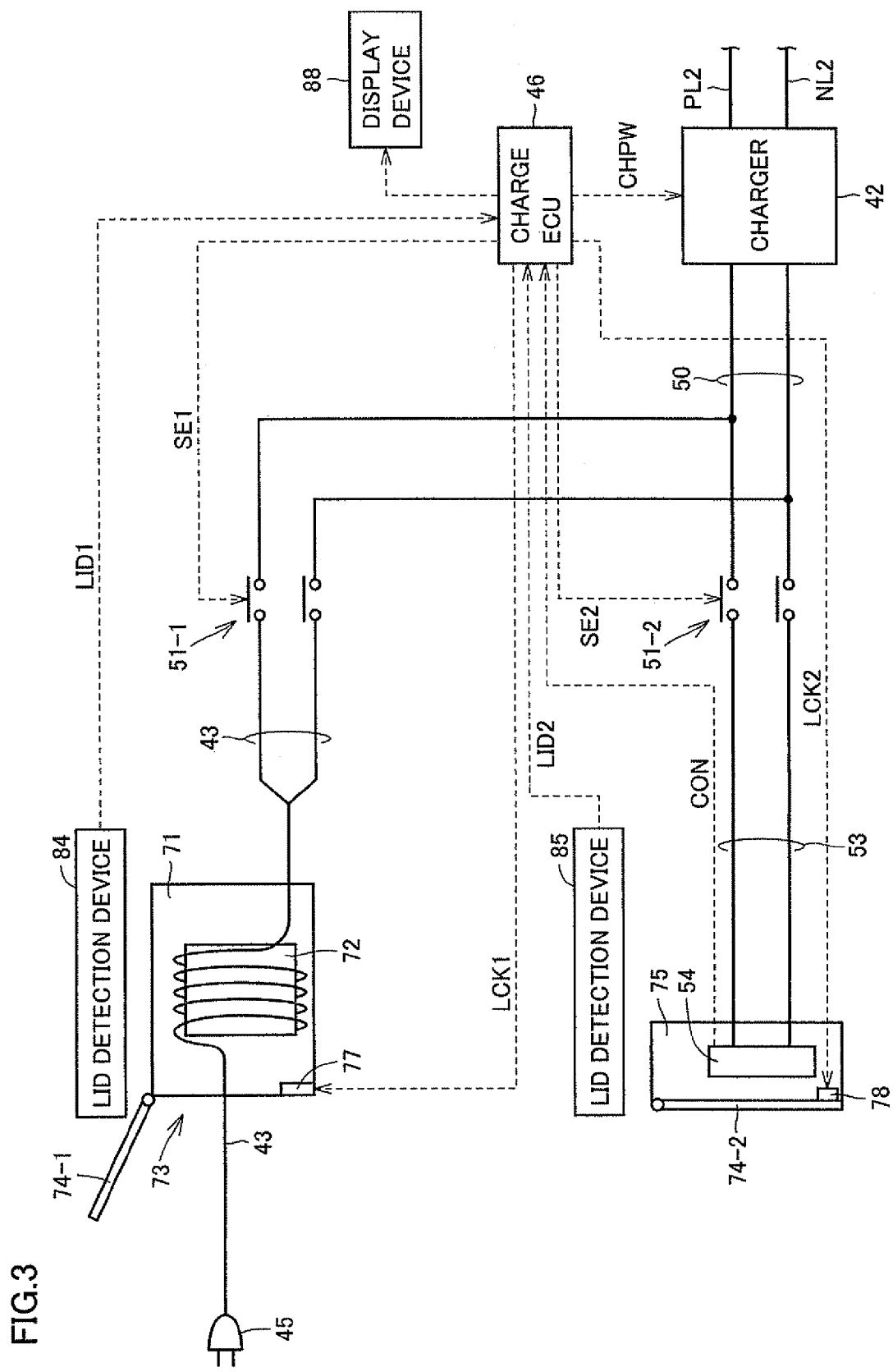
FIG. 3 is a block diagram for illustrating a configuration involved with charging of a power storage device in the first embodiment.

FIG. 2 is a diagram for illustrating arrangement of power cable 43 and inlet 54 shown in FIG. 1 in an electrically powered vehicle. FIG. 3 is a block diagram for illustrating a configuration involved with charging of the power storage device in the first embodiment.

As shown in FIGS. 2 and 3, a storage portion 71 for storing power cable 43 is provided in the vehicle. A cord reel 72 for winding up power cable 43 is provided in storage portion 71. In addition, an opening 73 for the user to take out power cable 43 stored in storage portion 71 is formed in the surface of the vehicle body. A lid 74-1 that can be opened and closed is attached to opening 73 (storage portion 71). In addition, a locking device 77 for fixing lid 74-1 in a closed state is installed in storage portion 71. Locking device 77 locks lid 74-1 in the closed state or unlocks lid 74-1 in response to a signal LCK1 from charge ECU 46.

Similarly, the vehicle is provided with a storage portion 75 for storing inlet 54. In storage portion 75, an opening for connecting inlet 54 to charge cable 55 is formed. In addition, a lid 74-2 that can be opened and closed is attached to the opening (storage portion 75). As lid 74-2 is opened, inlet 54 is exposed to the outside of the vehicle. Moreover, a locking device 78 for fixing lid 74-2 in the closed state is installed in storage portion 75. Locking device 78 locks lid 74-2 in the closed state or unlocks lid 74-2 in response to a signal LCK2 from charge ECU 46. It is noted that a connection detection signal CON is transmitted from inlet 54 to the charge ECU in response to connection of the connector to inlet 54.

Further, the vehicle is provided with a lid detection device 84 for detecting an opened state and a closed state of lid 74-1 and a lid detection device 85 for detecting an opened state and a closed state of lid 74-2. Lid detection device 84 transmits a signal LID1 indicating the opened state or the closed state of lid 74-1 to charge ECU 46. Lid detection device 85 transmits a signal LID2 indicating the opened state or the closed state of lid 74-2 to charge ECU 46.

Relay 51-1 is turned on and off in response to a signal SE1 from charge ECU 46. Relay 51-2 is turned on and off in response to a signal SE2 from charge ECU 46.

The vehicle further includes a display device 88. Display device 88 displays prescribed information in response to a control signal from charge ECU 46. Display device 88 has a function to display information recognizable by the user, and it is implemented, for example, by a liquid crystal display, an indicator, or the like.

Figure 4:
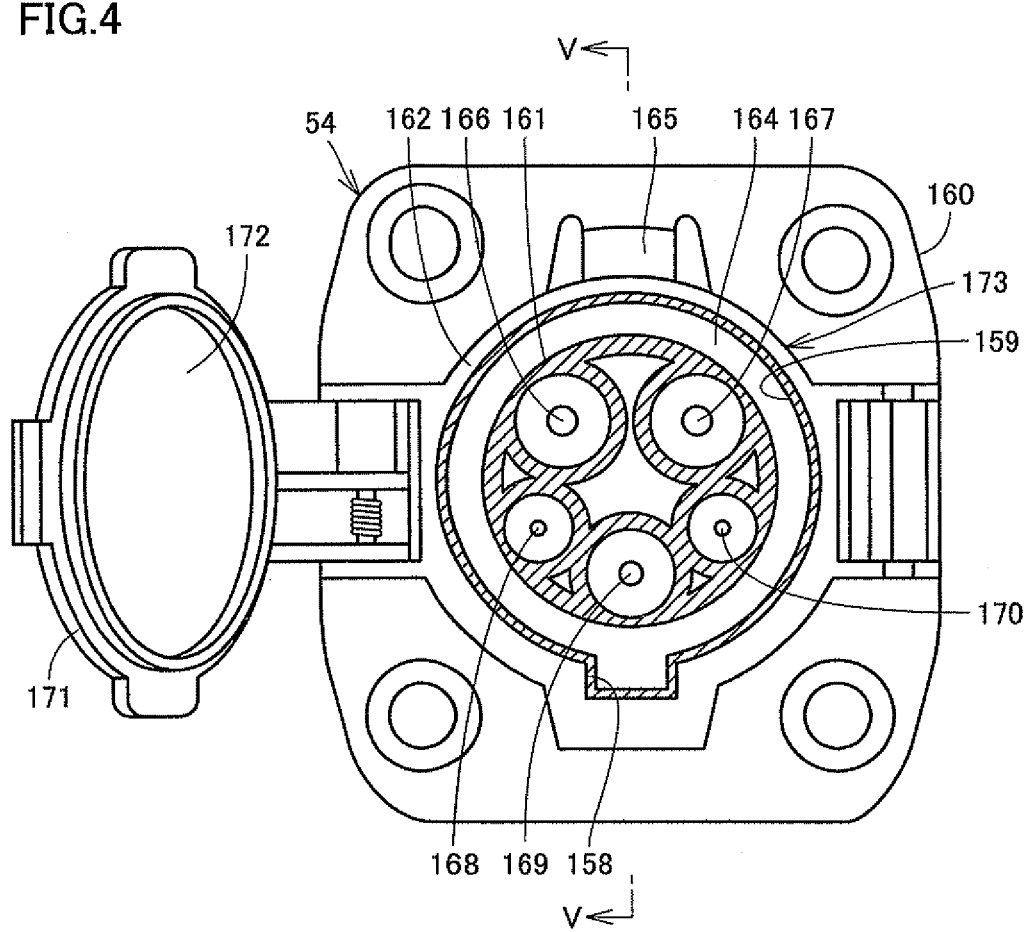
FIG. 4 is a front view showing details of inlet 54 to which a charge connector 56 shown in FIG. 1 is connected.
Figure 5:
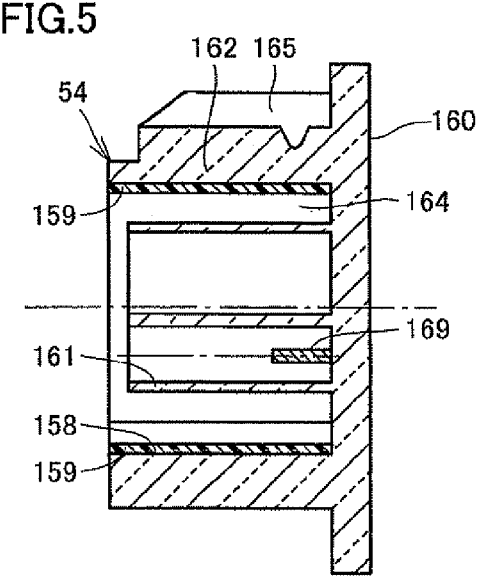
FIG. 5 is a cross-sectional view of inlet 54 along the line A-A in FIG. 4.

FIG. 4 is a front view showing details of inlet 54 to which charge connector 56 shown in FIG. 1 is connected. FIG. 5 is a cross-sectional view of inlet 54 along the line V-V in FIG. 4.

Referring to FIGS. 4 and 5, inlet 54 is configured to include a main body portion 160 and connection terminals 166, 167, 168, 169, and 170 serving as a connection portion.

Main body portion 160 is attached to the body of vehicle 100, in storage portion 75 shown in FIG. 2. Main body portion 160 has, as its components, a terminal protection portion 161, an outer circumferential portion 162, and an engagement pawl receiving portion 165, and it is formed by resin molding such that they are integrated. Connection terminals 166, 167, 168, 169, and 170, terminal protection portion 161, and outer circumferential portion 162 form a fitting portion 173.

Terminal protection portion 161 is provided to surround each terminal of connection terminals 166 to 170. Terminal protection portion 161 extends like a column along a direction of extension of connection terminals 166 to 170. Outer circumferential portion 162 is provided around an outer circumference of terminal protection portion 161. An annularly extending gap 164 is formed between terminal protection portion 161 and outer circumferential portion 162. Engagement pawl receiving portion 165 is provided at a position vertically above terminal protection portion 161. Engagement pawl receiving portion 165 has such a shape that it can be engaged with an engagement pawl provided in charge connector 56 shown in FIG. 1.

Main body portion 160 is attached such that connection terminals 166 to 170 extend toward the side of the vehicle, which is a position where an operator stands during charging. Main body portion 160 is provided further with a lid portion 171. Lid portion 171 is provided in storage portion 75 shown in FIG. 2 and it is provided further inside of lid 74-2 in FIG. 3. Lid portion 171 is provided in front of terminal protection portion 161 and outer circumferential portion 162 facing connection terminals 166 to 170, in such a manner that it can be opened and closed. An inner surface 172 of lid portion 171 abuts terminal protection portion 161 to thereby prevent rainwater or the like from entering a terminal portion.

A guide groove 158 is formed in inlet 54. Guide groove 158 has a function to guide charge connector 56 of charge cable 55 to a prescribed connection position in inlet 54 and a function to restrict a position (angle) of charge connector 56 for registration of respective positions of connection terminals 166 to 170 and connection terminals on the charge connector 56 side.

Guide groove 158 is formed in main body portion 160. Guide groove 158 is recessed from an inner circumferential surface of outer circumferential portion 162 and it extends in a direction parallel to a direction of extension of connection terminals 166 to 170. Guide groove 158 linearly extends at a position adjacent to connection terminals 166 to 170. Guide groove 158 is formed at a position vertically under terminal protection portion 161.

Connection terminals 166 to 170 are configured to include two terminals for power cables through which a current for charging flows, one terminal for grounding, and two terminals for a signal line. Connection terminals 166 to 170 are arranged around a central axis of terminal protection portion 161 extending like a column, at a distance from each other in a circumferential direction around the axis. Each terminal of connection terminals 166 to 170 is arranged in a space in a columnar shape, that is surrounded by terminal protection portion 161.

A configuration relating to charging of the vehicle has been described above. A charging operation will now be described.

Figure 6:
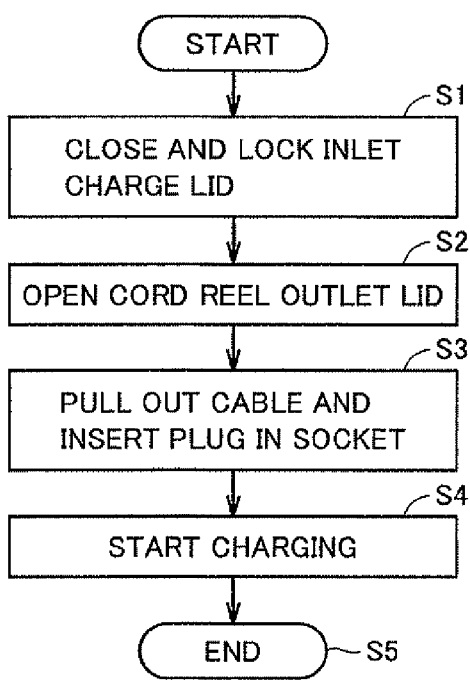
FIG. 6 is a flowchart showing an operation procedure when a cord reel is used for charging.

FIG. 6 is a flowchart showing an operation procedure when a cord reel is used for charging.

Referring to FIGS. 3, 6, in a case of charging by using cord reel 72, initially in step S1, lid 74-2 on the inlet 54 side is closed and locked. Locking device 78 locks lid 74-2 and lid detection device 85 transmits to charge ECU 46, signal LID2 indicating that lid 74-2 is closed.

In succession, in step S2, an operation for opening lid 74-1 on the cord reel 72 side is performed. When a command to open lid 74-1 is input to charge ECU 46 as a result of a driver's (operator's) switch operation or the like, charge ECU 46 transmits signal LCK1 to locking device 77 for unlocking.

Then, in step S3, the driver (operator) pulls cable 43 out of cord reel 72 and inserts plug 45 into a socket (wall outlet). Then, charging is started in step S4 and the process ends in step S5.

Figure 7:
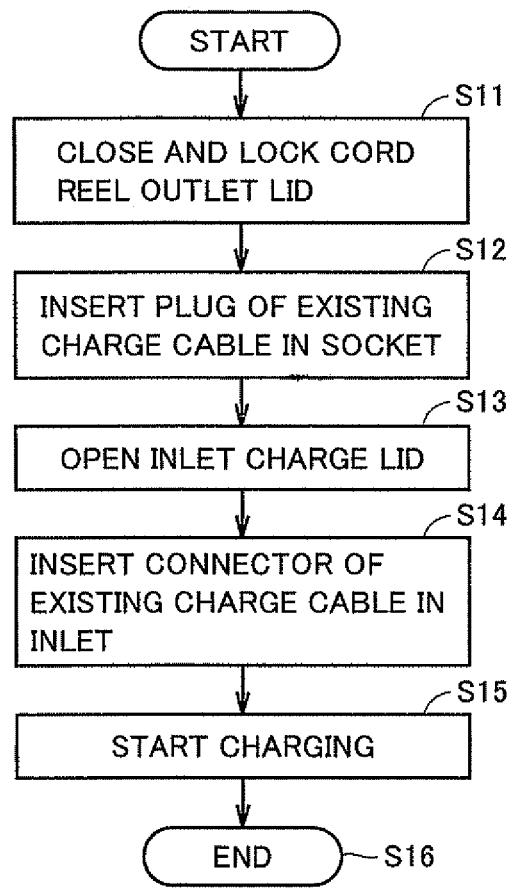
FIG. 7 is a flowchart for illustrating an operation procedure in performing inlet charging.

FIG. 7 is a flowchart for illustrating an operation procedure in performing inlet charging.

Referring to FIGS. 3, 7, in a case of charging by using inlet 54, initially in step S11, lid 74-1 on the cord reel 72 side is closed. Then, locking device 77 locks lid 74-1. In addition, lid detection device 84 detects the closed state of lid 74-1 and signal LID1 is transmitted to charge ECU 46.

In succession, in step S13, in response to a driver's (operator's) instruction, a command to open lid 74-2 on the inlet 54 side is input to charge ECU 46. Charge ECU 46 transmits signal LCK2 to locking device 78 to unlock lid 74-2. Then, in step S14, connector 56 of charge cable 55 shown in FIG. 1 is inserted in inlet 54 through an opening portion of open lid 74-2. Then, charging is started in step S15 and the procedure for starting charging ends in step S16.

Figure 8:
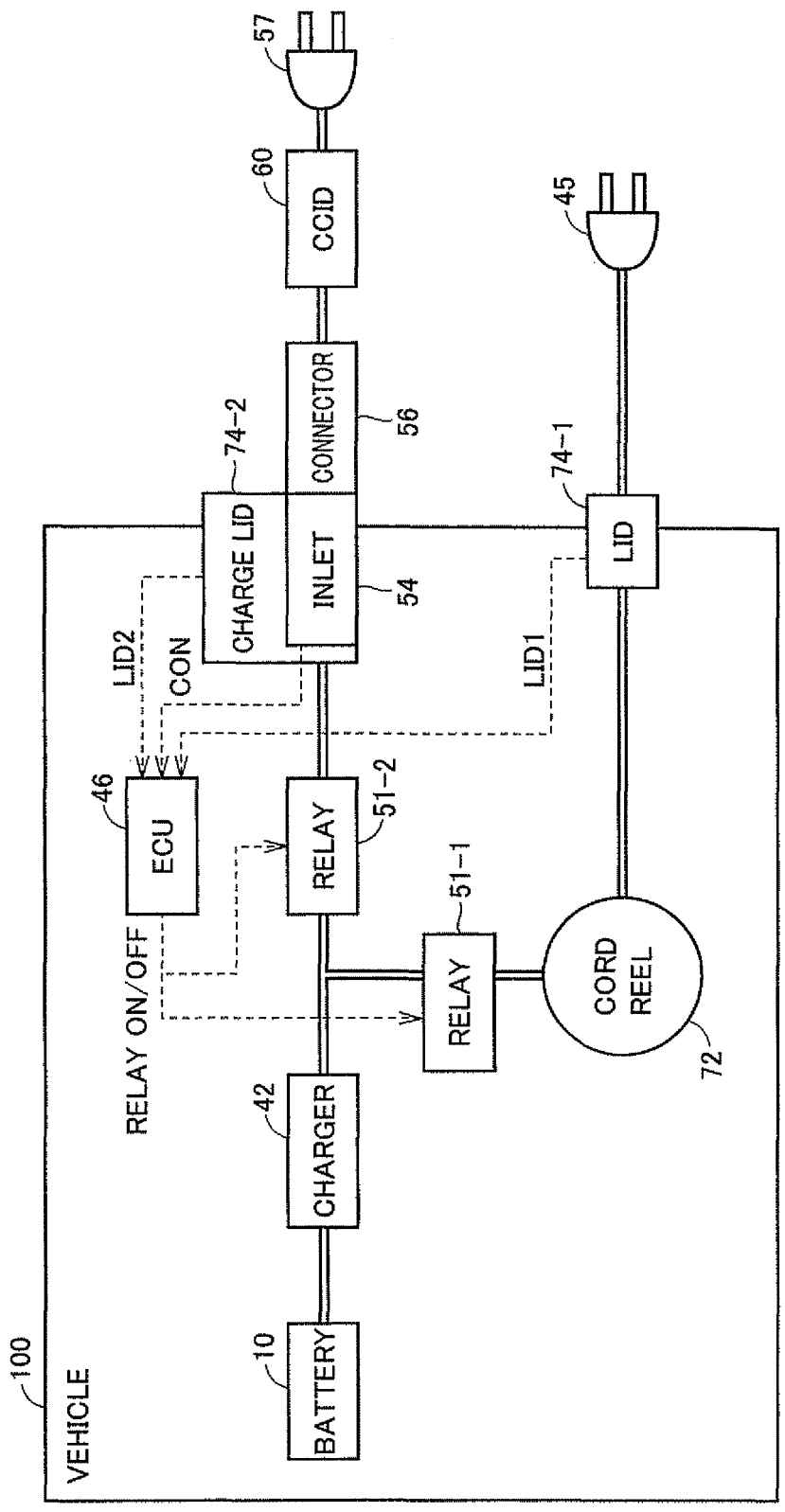
FIG. 8 is a schematic diagram of a charging path in a vehicle 100.

FIG. 8 is a schematic diagram of a charging path in vehicle 100. A problem in a case where two charging paths as such are provided will be described with reference to this schematic diagram.

Referring to FIG. 8, an electric power line from charger 42 is branched to the inlet 54 side and to the cord reel 72 side. Relays 51-1, 51-2 are installed on these branched paths. As connector 56 is inserted in inlet 54, charge ECU 46 controls relay 51-2 to be conducting, so that charging is performed through a charging path on the inlet 54 side. On the other hand, as lid 74-1 at the exit of cord reel 72 is opened, charge ECU 46 controls relay 51-1 to be conducting, so that charging is performed through a charging path on the cord reel 72 side.

In connection therewith, when insertion of connector 56 and the opened state of lid 74-1 are both satisfied, charge ECU 46 renders a relay earlier in satisfying this condition conducting. Charge lid 74-2 of inlet 54 and lid 74-1 at the exit of the cord reel are each provided with a locking mechanism. In addition, lid detection device 84, 85 shown in FIG. 3 sends information on opening and closing of the lid to charge ECU 46.

As described with reference to FIGS. 4, 5, regarding inlet 54, connection terminals 166 to 170 are structured such that an object present nearby is less likely to contact with the terminals from the outside, because terminal protection portion 161 is provided around them. In addition, inlet 54 is fixed to the vehicle.

Plug 45, however, can be moved freely to some extent in order to insert the plug into a socket in a household (wall outlet) and further a terminal is exposed. When a voltage is applied to such a terminal from the vehicle side, an object nearby, the ground or the like comes in contact, which may lead to short-circuiting, leakage or the like. For example, if welding occurs in relay 51-1, 51-2 while a voltage is externally applied from the inlet side through connector 56, such a concern arises.

FIG. 9 is a diagram for illustrating permission/prohibition of charging while a relay has welded. It is noted that, in FIG. 9, conditionally permitted means that charging through a path on the cord reel 72 side is permitted only when closing and locking of charge lid 74-2 could be confirmed.

As shown in the first row in FIG. 9, in a case where relay 51-2 on the inlet 54 side in FIG. 8 has welded, charging through a path on the cord reel 72 side is prohibited in principle. This is because a voltage may externally be applied to inlet 54 and if relay 51-1 is rendered conductive, the voltage is applied to the terminal of plug 45 and resultant leakage or short-circuiting may occur. It is expected, however, that not permitting any charging will cause such inconvenience as inability to run the vehicle due to a low charge level, and thus charging is conditionally permitted. Namely, only when closing and locking of charge lid 74-2 could be confirmed, charge ECU 46 permits charging through a path on the cord reel 72 side.

Then, as shown in the second row in FIG. 9, in a case where relay 51-2 on the inlet side is not faulty but relay 51-1 on the cord reel side has welded, charging on the inlet 54 side is prohibited and charging only on the cord reel 72 side is permitted. This is because, if charging is performed on the inlet 54 side, a voltage is applied to the tip end of plug 45 on the cord reel 72 side through welded relay 51-1 and resultant leakage or short-circuiting may occur.

In succession, as shown in the third row in FIG. 9, in a case where relay 51-2 on the inlet side and relay 51-1 on the cord reel side have both welded, charging through a path on the inlet side and charging through a path on the cord reel 72 side are both prohibited. It is noted that, only when closing and locking of charge lid 74-2 could be confirmed, charge ECU 46 permits charging through the path on the cord reel 72 side.

It is also possible that two or more charging paths are provided in the vehicle. In that case, when welding of two or more of a plurality of relays provided in the plurality of charging paths respectively is detected, charge ECU 46 prohibits charging of power storage device 10 from the outside of the vehicle. Then, when a charge lid on a path, which is a charging path other than a charging path selected for charging, and on which welding of a relay occurred, is closed and locked, charging through the selected charging path is permitted.

As shown in the fourth row in FIG. 9, in a case where it could be confirmed that neither of relay 51-2 on the inlet side and relay 51-1 on the cord reel side is faulty, charge ECU 46 permits both of charging through a path on the inlet side and charging through a path on the cord reel 72 side.

In addition to control of permission and prohibition above, charge ECU 46 may provide display of a charging path through which charging is not permitted, on a display screen or the like for notification to the user.

Figure 10:
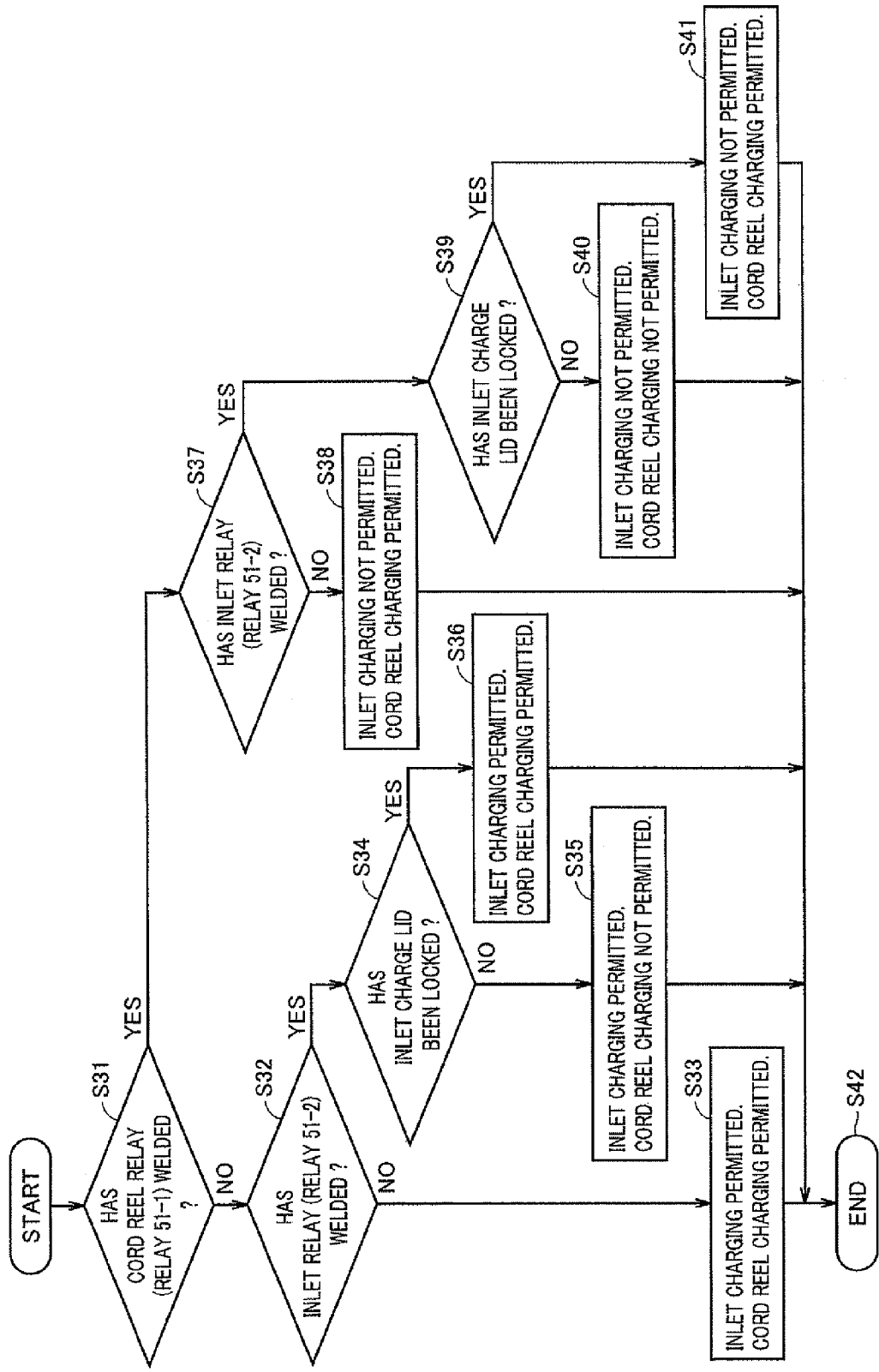
FIG. 10 is a flowchart for illustrating determination as to permission of charging while a relay has welded.

FIG. 10 is a flowchart for illustrating determination as to permission of charging while a relay has welded. It is noted that, prior to execution of the flowchart shown in FIG. 10, determination as to welding of relay 51-1, 51-2 is made at the time when previous charging ended. Determination as to welding of relay 51-1, 51-2 is made based on whether a voltage detected by a voltage sensor provided at an input of charger 42 lowers or not when any of relays 51-1, 51-2 is turned off. The result of determination is held in a memory in charge ECU 46.

Referring to FIGS. 8, 10, initially, when the processing is started, whether a cord reel relay (relay 51-1) has welded or not is determined in step S31. This determination as to welding is made by reading the result of determination as to welding made at the time when previous charging ended.

When it is determined in step S31 that relay 51-1 has not welded, the process proceeds to step S32. In step S32, whether an inlet relay (relay 51-2) has welded or not is determined. When it is determined in step S32 that relay 51-2 has not welded, it is further determined in step S33 that charging through a charging path on the inlet 54 side is permitted and charging through a charging path on the cord reel 72 side is also permitted. Then, the process proceeds to step S42.

When it is determined in step S32 that relay 51-2 has welded, the process proceeds to step S34. In step S34, whether lid 74-2 on the inlet 54 side has been locked or not is determined. When lid detection device 85 detects opening of lid 74-2 and it is determined that lid 74-2 has not been locked, the process proceeds to step S35. In step S35, it is determined that charging on the inlet 54 side is permitted but charging through a charging path on the cord reel 72 side is not permitted, and the process proceeds to step S42.

When it is determined in step S34 that lid 74-2 on the inlet 54 side has been locked, that is, when lid detection device 85 confirmed closing of lid 74-2 and charge ECU 46 instructs locking device 78 to lock lid 74-2 so as not to open lid 74-2, the process proceeds to step S36. In step S36, it is determined that charging through a charging path on the inlet 54 side is permitted and charging through a charging path on the cord reel 72 side is also permitted.

When it is determined in step S31 that relay 51-1 on the cord reel 72 side has welded, the process proceeds to step S37. In step S37, whether relay 51-2 on the inlet 54 side has welded or not is determined. This determination is made also as a result of reading of results of checking of welding at the time when previous charging ended.

When it is determined in step S37 that relay 51-2 on the inlet 54 side has not welded, the process proceeds to step S38. In step S38, it is determined that charging through a charging path on the inlet 54 side is not permitted but charging through a charging path on the cord reel 72 side is permitted, and the process proceeds to step S42.

When it is determined in step S37 that relay 51-2 on the inlet 54 side has welded, the process proceeds to step S39. In step S39, whether lid 74-2 on the inlet 54 side has been locked or not is determined. Namely, when lid detection device 85 detects opening of lid 74-2, determination as unlocked is made. On the other hand, when lid 74-2 is closed in lid detection device 85 and charge ECU 46 instructs locking device 78 to lock lid 74-2 so as not to open lid 74-2, it is determined that lid 74-2 has been locked.

When it is determined in step S39 that lid 74-2 has not been locked, the process proceeds to step S40. In step S40, it is determined that charging through a charging path on the inlet 54 side is not permitted and charging through a charging path on the cord reel 72 side is not permitted either, and the process proceeds to step S42.

On the other hand, when it is determined in step S39 that lid 74-2 on the inlet 54 side has been locked, the process proceeds to step S41. In step S41, it is determined that charging through a charging path on the inlet 54 side is not permitted but charging through a charging path on the cord reel 72 side is permitted. Then, the process proceeds to step S42 and determination as to whether charging is permitted or not ends.

Charge ECU 46 controls locking devices 77, 78, relays 51-1, 51-2, and charger 42 based on determination as to whether charging can be performed or not, that was made in the flowchart described with reference to FIG. 10.

Briefly summarizing the description above, in a system using both of the cord reel charging system and inlet charging, when one charge electric power switching relay has welded and when charging is carried out through another charging path, both of relays 51-1, 51-2 are conductive and hence such concerns as leakage and short-circuiting arise. In order to address this, when one relay has welded, charging through the other path is prohibited. Alternatively, when both relays have welded, charging is prohibited. It is noted that, when one lid is locked in a closed state and a connector portion is structured such that short-circuiting or leakage is less likely, charging in the other way, that is, on the cord reel side, is permitted.

By doing so, even though a relay has welded, leakage or short-circuiting can be prevented. Further, when locking of the charge lid on the inlet side could be confirmed in spite of welding of the relay, charging through the charging path on the cord reel side is permitted. Thus, even when a charge level of the power storage device is low and it is impossible to move the vehicle, that is, to bring the vehicle to a service garage unless the vehicle is charged, charging can be carried out and the vehicle can be moved to the service garage.

[Variation]

An example where two charging paths of the charging path on the inlet 54 side and the charging path on the cord reel 72 side are provided has been shown in the first embodiment above. In addition, an example where two charging paths such as a rapid charging path and a normal-rate charging path are provided is also possible.

Figure 11:
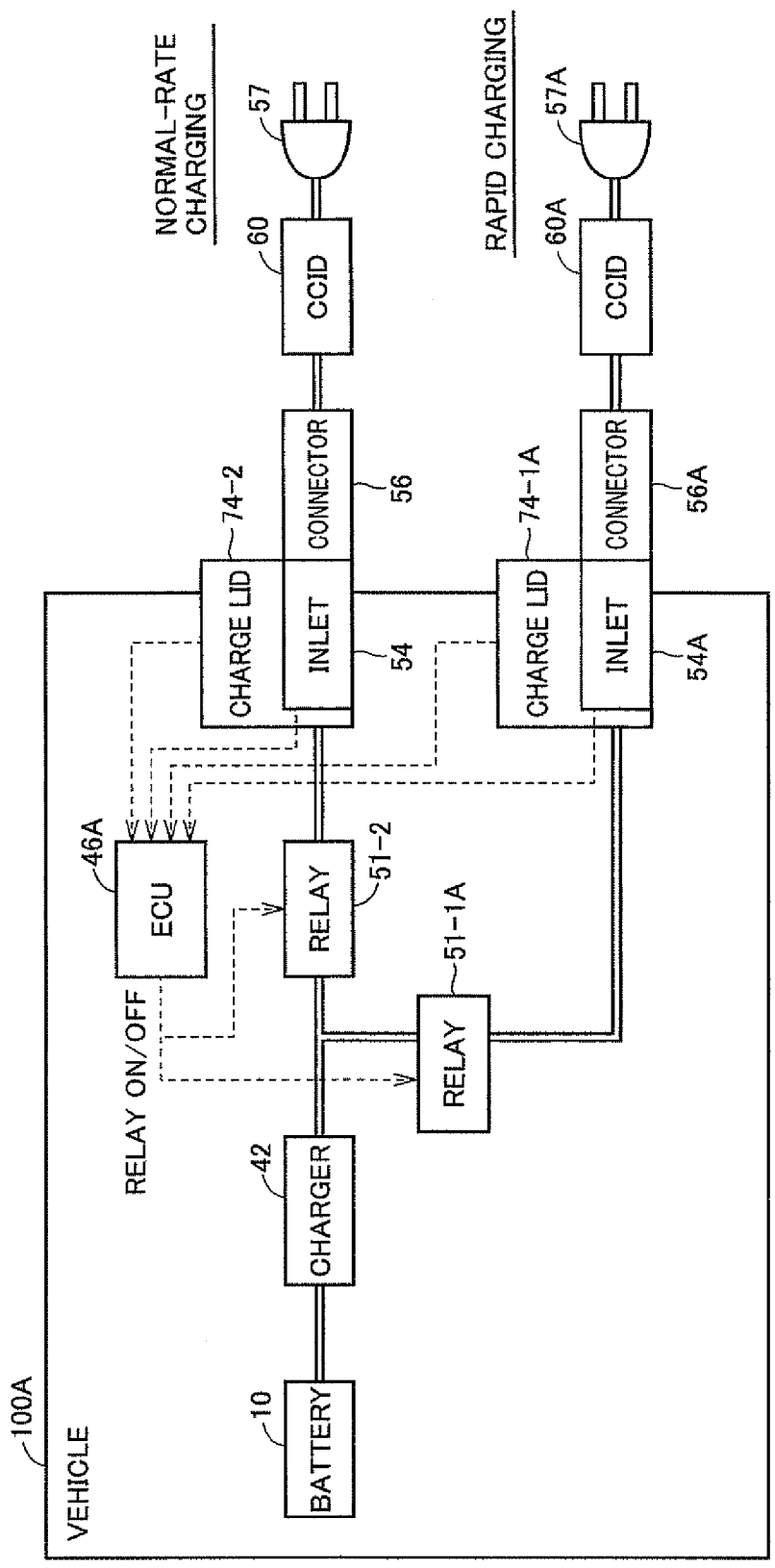
FIG. 11 is a diagram schematically showing a charging path in a vehicle 100A in a variation.

FIG. 11 is a diagram schematically showing a charging path in a vehicle 100A in a variation.

Vehicle 100A shown in FIG. 11 includes a relay 51-1A, an inlet 54A, and a charge lid 74-1A, instead of relay 51-1, cord reel 72 and lid 74-1, and plug 45 in FIG. 8. A connector 56A is connected to inlet 54A. Connector 56A is provided at an end portion of the charge cable for rapid charging. A CCID 60A is provided in an intermediate portion of this cable and a plug 57A is provided at the other end thereof.

FIG. 12 is a diagram for illustrating determination as to permission/prohibition of charging in the variation in FIG. 11. It is noted that conditionally permitted means that charging is permitted when closing and locking of the other charge lid could be confirmed.

As shown in the first row in FIG. 12, when normal-rate charging relay 51-2 has welded and rapid charging relay 51-1A is not faulty, charging on the normal-rate charging side is permitted but charging on the rapid charging side is not permitted.

In addition, as shown in the second row, when normal-rate charging relay 51-2 is not faulty but rapid charging relay 51-1A has welded, charging through the charging path on the normal-rate charging side is prohibited and charging through the charging path on the rapid charging side is permitted. Moreover, as shown in the third row, when relays 51-2, 51-1A have both welded, charging through both of the charging path on the normal-rate charging side and the charging path on the rapid charging side is prohibited.

As shown in the fourth row, when neither of relays 51-2, 51-1A is faulty, charging through both of the charging path on the normal-rate charging side and the charging path on the rapid charging side is permitted.

Indication as conditionally permitted in FIG. 12 means that charging may be prohibited but when closing and locking of the other charge lid is confirmed, charging may be permitted. By doing so, even when the relay has welded, charging to the extent possible can be carried out and it is advantageous, for example, in moving a vehicle to a service garage or the like.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

DESCRIPTION OF THE REFERENCE SIGNS 1, 2, 45A, 45B terminal; 10 power storage device; 11 system main relay; 12 converter; 14, 18, 20 voltage sensor; 16 current sensor; 22 auxiliary machinery; 30 inverter; 32 motor generator; 34 power split device; 36 engine; 38 drive wheel; 42 charger; 43, 50, 53 power cable; 44, 56A, 59 connector; 45, 57, 57A plug; 48, 58 external power supply; 51-1, 51-2 relay; 54, 54A inlet; 55 charge cable; 56 charge connector; 71, 75 storage portion; 72 cord reel; 73 opening; 74-1, 74-2 charge lid; 77, 78 locking device; 84, 85 lid detection device; 88 display device; 100, 100A vehicle; 158 guide groove; 160 main body portion; 161 terminal protection portion; 162 outer circumferential portion; 164 gap; 166 to 170, 166, 167, 168, 169, 170 connection terminal; 171 lid portion; 172 inner surface; 173 mating portion; 741A charge lid; C smoothing capacitor; 46 charge ECU; MNL main negative bus; MPL main positive bus; NL1 negative electrode line; and PL1 positive electrode line.

The invention claimed is:

1. A power supply system for a vehicle, the power supply system comprising:
a power storage device;
a plurality of charging paths for charging said power storage device with electric power from outside;
a plurality of relays provided on said plurality of charging paths respectively, each of the plurality of relays being configured to switch between supply and cut-off of electric power; and
a charge control unit for making a selection as to through which charging path among said plurality of charging paths charging of said power storage device is permitted, based on a state of welding of said plurality of relays when welding of a relay provided on a first charging path among said plurality of charging paths is detected, said charge control unit prohibits charging of said power storage device through a charging path other than the first charging path among said plurality of charging paths.

2. The power supply system according to claim 1, further comprising:
a lid for disconnecting any of said plurality of charging paths from an external power supply; and
a locking portion for fixing said lid in a disconnected state, wherein
said charge control unit makes a selection as to through which charging path among said plurality of charging paths charging of said power storage device is permitted, further based on a state of locking of said lid in addition to the state of welding of said plurality of relays.

3. The power supply system according to claim 2, wherein when said lid is locked in such a state that a corresponding charging path is disconnected from the external power supply, said charge control unit permits charging through another charging path.

4. The power supply system according to claim 1, wherein when welding of two or more of said plurality of relays is detected, said charge control unit prohibits charging of said power storage device from the outside of the vehicle.

5. The power supply system according to claim 1, wherein a first charging path among said plurality of charging paths is a charging path through a charge inlet, and
a second charging path among said plurality of charging paths is a charging path through a cord reel connected to a side of the vehicle and a connection portion provided at a tip end of said cord reel.

6. The power supply system according to claim 1, wherein a first charging path among said plurality of charging paths is a charging path to which a first external power supply for rapid charging is connected, and
a second charging path among said plurality of charging paths is a charging path to which a second external power supply for charging at a rate lower than in said rapid charging is connected.

7. The power supply system according to claim 1, wherein said charge control unit notifies a user of a charging path through which charging is not permitted.

8. A vehicle comprising:
a power storage device;
a plurality of charging paths for charging said power storage device with electric power from outside of the vehicle;
a plurality of relays provided on said plurality of charging paths respectively, each of the plurality of relays being configured to switch between supply and cut-off of electric power; and
a charge control unit for making a selection as to through which charging path among said plurality of charging paths charging of said power storage device is permitted, based on a state of welding of said plurality of relays wherein when welding of a relay provided on a first charging path among said plurality of charging paths is detected, said charge control unit prohibits charging of said power storage device through a charging path other than the first charging path among said plurality of charging paths.

9. The vehicle according to claim 8, further comprising:
a lid for disconnecting any of said plurality of charging paths from an external power supply; and
a locking portion for fixing said lid in a disconnected state, wherein
said charge control unit makes the selection as to through which charging path among said plurality of charging paths charging of said power storage device is permitted, further based on a state of locking of said lid in addition to the state of welding of said plurality of relays.

10. The vehicle according to claim 9, wherein
when said lid is locked in such a state that a corresponding charging path is disconnected from the external power supply, said charge control unit permits charging through another charging path.

11. The vehicle according to claim 8, wherein
when welding of two or more of said plurality of relays is detected, said charge control unit prohibits charging of said power storage device from the outside of the vehicle.

12. The vehicle according to claim 8, wherein
a first charging path among said plurality of charging paths is a charging path through a charge inlet, and
a second charging path among said plurality of charging paths is a charging path through a cord reel connected to a side of the vehicle and a connection portion provided at a tip end of said cord reel.

13. The vehicle according to claim 8, wherein
a first charging path among said plurality of charging paths is a charging path to which a first external power supply for rapid charging is connected, and
a second charging path among said plurality of charging paths is a charging path to which a second external power supply for charging at a rate lower than in said rapid charging is connected.

14. The vehicle according to claim 8, wherein
said charge control unit notifies a user of a charging path through which charging is not permitted.

* * * * *